US012072093B2

(12) United States Patent
Jha et al.

(10) Patent No.: US 12,072,093 B2
(45) Date of Patent: Aug. 27, 2024

(54) AIRCRAFT LIGHT, AIRCRAFT COMPRISING AN AIRCRAFT LIGHT, AND METHOD OF MANUFACTURING AN AIRCRAFT LIGHT

(71) Applicant: Goodrich Lighting Systems GmbH & Co. KG, Lippstadt (DE)

(72) Inventors: Anil Kumar Jha, Lippstadt (DE); Marion Depta, Lippstadt (DE); Andre Hessling von Heimendahl, Koblenz (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/408,387

(22) Filed: Jan. 9, 2024

(65) Prior Publication Data
US 2024/0247782 A1 Jul. 25, 2024

(30) Foreign Application Priority Data
Jan. 24, 2023 (EP) .................................. 23153170

(51) Int. Cl.
*F21V 9/40* (2018.01)
*B64D 11/00* (2006.01)
*B64D 47/06* (2006.01)
*F21V 5/04* (2006.01)

(52) U.S. Cl.
CPC ................ *F21V 9/40* (2018.02); *B64D 11/00* (2013.01); *B64D 47/06* (2013.01); *F21V 5/04* (2013.01); *B64D 2011/0038* (2013.01); *B64D 2011/0053* (2013.01)

(58) Field of Classification Search
CPC .............. B64D 11/00; B64D 47/02–06; B64D 2011/0038; B64D 2011/0053
See application file for complete search history.

(56) References Cited

U.S. PATENT DOCUMENTS

| 9,196,800 B2 | 11/2015 | Reeh et al. |
| 9,388,959 B2 | 7/2016 | Lessard et al. |
| 9,515,240 B2 | 12/2016 | Diana et al. |

(Continued)

FOREIGN PATENT DOCUMENTS

| WO | 2015178981 | 11/2015 |
| WO | 2022265068 | 12/2022 |

OTHER PUBLICATIONS

European Patent Office; European Search Report dated Jun. 29, 2023 in Application No. 23153170.8.

*Primary Examiner* — Jason M Han
(74) *Attorney, Agent, or Firm* — SNELL & WILMER L.L.P.

(57) ABSTRACT

An aircraft light providing a white light output has a light source that comprises a light emitting semiconductor for emitting light having an initial light spectrum; a first light converting material, arranged over the light emitting semiconductor; and a light transmissive layer, covering the first light converting material. A first portion of the light, which is emitted by the light emitting semiconductor, is shifted towards longer wavelengths by the first light converting material. The aircraft light further comprises a second light converting material, which is arranged over the light transmissive layer of the light source and a lens element, which is arranged over the second light converting material, with light exiting the lens element forming at least a portion of the white light output of the aircraft light.

15 Claims, 4 Drawing Sheets

(56) References Cited

U.S. PATENT DOCUMENTS

| | | |
|---|---|---|
| 10,343,793 B2 | 7/2019 | Hessling-Von Heimendahl et al. |
| 10,886,434 B2 | 1/2021 | Ishii et al. |
| 11,060,682 B1 | 7/2021 | Saxena et al. |
| 2002/0079505 A1 | 6/2002 | Becker et al. |
| 2007/0246734 A1 | 10/2007 | Lee et al. |
| 2009/0010013 A1 | 1/2009 | Hessling et al. |
| 2011/0031516 A1 | 2/2011 | Basin et al. |
| 2019/0194537 A1 | 6/2019 | Sekiguchi et al. |

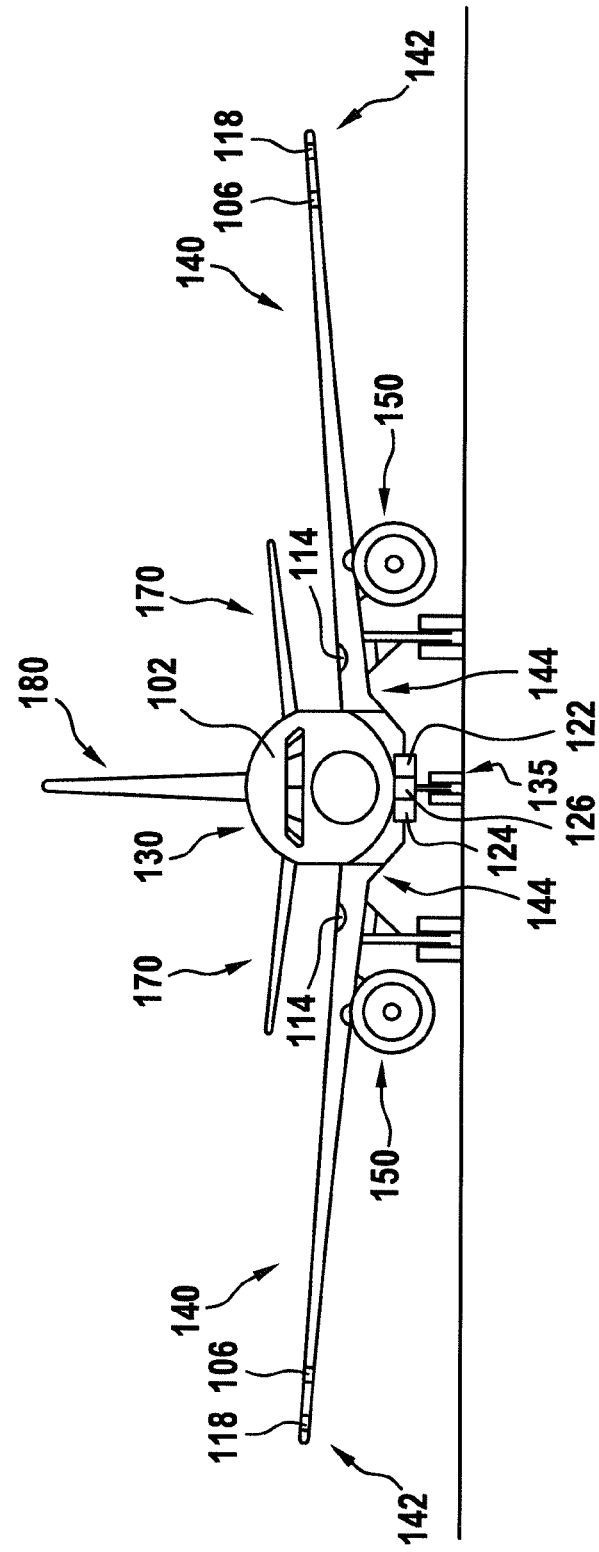

AIRCRAFT LIGHT, AIRCRAFT COMPRISING AN AIRCRAFT LIGHT, AND METHOD OF MANUFACTURING AN AIRCRAFT LIGHT

CROSS-REFERENCE TO RELATED APPLICATIONS

This application claims priority to, and the benefit of, EP Patent Application No. 23153170.8, filed Jan. 24, 2023 and titled "AIRCRAFT LIGHT, AIRCRAFT COMPRISING AN AIRCRAFT LIGHT, AND METHOD OF MANUFACTURING AN AIRCRAFT LIGHT," which is incorporated by reference herein in its entirety for all purposes.

FIELD

The present invention relates to aircraft lighting. In particular, the present invention relates to an aircraft light, further in particular to an aircraft light providing a white light output. The present invention further relates to an aircraft comprising such an aircraft light, and to a method of manufacturing an aircraft light providing a white light output.

BACKGROUND

Almost all aircraft are equipped with numerous lights, including exterior aircraft lights and interior aircraft lights. In particular, large passenger airplanes are provided with a wide variety of exterior and interior aircraft lights.

Exterior aircraft lights are employed for a wide variety of different purposes, such as for allowing the passengers and/or air crew to view the outside, for passive visibility, for signaling purposes, etc. Examples of such exterior light units are navigation lights, also referred to as position lights, red-flashing beacon lights, white strobe anti-collision lights, wing scan lights, take-off lights, landing lights, taxi lights, runway turn-off lights, etc.

Passenger aircraft, such as commercial airplanes, comprising a passenger cabin with passenger seats, are usually equipped with general passenger cabin lights for illuminating the passenger cabin and washroom lights for illuminating washrooms. Such passenger aircraft are usually further equipped with a plurality of individually switchable passenger reading lights and a plurality of individually switchable signal lights. All of these lights are examples of interior aircraft lights.

Many of these aircraft lights are desired to emit white light. Many exterior aircraft lights are in particular required to emit white light having a predefined chromaticity, as it is for example defined in section 25.1397 of the Federal Aviation Regulations (FAR), prescribed by the US Federal Aviation Administration (FAA). White light that fulfills such requirements is denoted as "aviation white light".

From an efficiency and reliability point of view, it is often desirable to use light emitting semiconductor diodes (LEDs) as light sources for aircraft lights. Commercially available LEDs, however, do often not provide the desired spectrum of white light, such as aviation white light. This is in particular the case when the light emission surfaces of the LEDs are overmolded with an optically dense material, such as silicone.

It would therefore be beneficial to provide an aircraft light that includes a semiconductor light source and that is capable to emit light having a desired kind of white light output. In particular, it would be beneficial to provide such an aircraft light that is capable to emit aviation white light, as it is defined in section 25.1397 of the FAR. It would further be beneficial to provide an aircraft having such aircraft light and a method of manufacturing such an aircraft light.

SUMMARY

Exemplary embodiments of the invention include an aircraft light, providing a white light output, which has a light source, wherein the light source comprises: a light emitting semiconductor for emitting light having an initial light spectrum; a first light converting material, which is arranged over the light emitting semiconductor, and a light transmissive layer, which covers the first light converting material. The first light converting material is configured such that a first portion of the light, which is emitted by the light emitting semiconductor, is shifted towards longer wavelengths by the first light converting material. The aircraft light further comprises a second light converting material, which is arranged over the light transmissive layer of the light source, in particular on the side of the light transmissive layer that is opposite to the first light converting material; and a lens element, which is arranged over the second light converting material, so that light exiting the lens element forms at least a portion of the white light output of the aircraft light. The second light converting material is configured such that a second portion of the light, which is emitted by the light emitting semiconductor, is shifted towards longer wavelengths by the second light converting material.

The initial light spectrum may comprise light having only a single wavelength, or light having a plurality of wavelengths.

Exemplary embodiments of the invention also include a method of manufacturing an aircraft light, which provides a white light output in operation, wherein the method comprises:
providing a light source that comprises a light emitting semiconductor for emitting light having an initial light spectrum, a first light converting material, arranged over the light emitting semiconductor, and a light transmissive layer, covering the first light converting material, wherein the first light converting material is configured to effect a wavelength shift towards longer wavelengths for a first portion of the light, emitted by the light emitting semiconductor;
arranging a second light converting material over the light transmissive layer of the light source, wherein the second light converting material is configured to effect a wavelength shift towards longer wavelengths for a second portion of the light, emitted by the light emitting semiconductor; and arranging a lens element over the second light converting material.

In an aircraft light according to an exemplary embodiment of the invention, the spectrum of a portion of the light, which is emitted by the light emitting semiconductor, is shifted towards longer wavelengths, i.e. towards the red side of the spectrum, by the first light converting material, which is provided as part of the light source. This effect may, however, not be sufficient for generating the desired white light output of the aircraft light, i.e. a white light output having the desired chromaticity. The chromaticity may, for example, be represented in an International Commission on Illumination (CIE) 1931 chromaticity diagram. The spectrum shifting effect caused by the first light converting material may in particular not be sufficient in cases where a light output surface of the light source is covered with an optically dense material, such as silicone, because the optically dense material reduces the occurrence of internal reflection at said light output surface and, therefore, reduces the instances of wavelength shifting within the first light converting material.

The second light converting material, when arranged over the light transmissive layer of the light source, causes additional instances of wavelength shifting and, therefore, causes a further shift of the spectrum of a portion of the light, which is emitted by the light emitting semiconductor. The second light converting material may in particular cause an additional shift of the spectrum of a portion of light that is emitted by the light emitting semiconductor and that has not been shifted by the first light converting material.

The above described effect of the second light converting material results in an additional shift of the spectrum of the light emitted by the aircraft light towards longer wavelengths. By appropriately choosing the characteristics and the thickness of the second light converting material, the combination of the first and second light converting materials may cause a shift of the spectrum of the emitted light that results in the aircraft light emitting a desired shade of white light. In particular, the aircraft light may thus emit a white light output having a spectrum that is within or sufficiently close to aviation white light, as it is defined in section 25.1397 of the FAR.

In case the aircraft light is an interior aircraft light, such as a passenger reading light, the spectrum of the light output may be shifted even further, i.e. beyond the spectrum of aviation white light, in order to output "warm" white light. Such "warm" white light may be perceived as more pleasant by the human eye.

Each of the first and second light converting materials may be configured for emitting light having a second spectrum, when it is excited by light having a first spectrum, which is emitted by the light emitting semiconductor. The second spectrum may be shifted towards longer wavelengths with respect to the first spectrum. Absorbing blue light and emitting yellow or red light, i.e. light having longer wavelengths than the absorbed blue light, achieves the desired effect of shifting the light towards longer wavelengths, when it passes through the respective light converting material. Due to the color mixing of blue light, passing through the respective light converting material in an unaltered manner, and yellow/red light, having experienced the wavelength shift in the respective light converting material, the desired white light output may result.

In an embodiment, the first light converting material and/or the second light converting material may comprise Cerium doped Yttrium Aluminium Garnet and/or a nitridosilicate based light converting material. Such materials have been found to be very effective in causing the desired shift of the spectrum of incoming light towards longer wavelengths.

In the field of wavelength converted light sources, light converting materials are often referred to as phosphors. Accordingly, it can be said that the light source of the aircraft light, as described herein, comprises a first phosphor and that a second phosphor is arranged over the light transmissive layer of the light source. The terms light converting material and phosphor/phosphor material may be used interchangeably in the context of the present description.

In an embodiment, the first light converting material and the second light converting material may have the same wavelength shifting characteristics. In particular, the first light converting material and the second light converting material may comprise the same optically active substance, such as Cerium doped Yttrium Aluminium Garnet and/or a nitridosilicate based light converting material.

In an embodiment, the second light converting material comprises an optically active substance, such as Cerium doped Yttrium Aluminium Garnet and/or a nitridosilicate based light converting material, that is embedded into a carrier material. The may allow for conveniently, efficiently, and reliably applying and fixing the optically active substance to the light transmissive layer of the light source.

In an embodiment, the carrier material includes a silicone matrix or an epoxy matrix or a polyurethane matrix. Such matrix materials have been found as well-suited for applying and permanently fixing the optically active substance to the light transmissive layer of the light source.

In an embodiment, the initial light spectrum, i.e. the spectrum of the light, which is emitted by the light emitting semiconductor, may be blue or blueish, i.e. the wavelengths of the light, emitted by the light emitting semiconductor, may predominantly be in a range of between 450 nm and 500 nm. Blue light is well suited for being converted other light color(s) by appropriate light converting materials, with the remaining blue light and the other light color(s) then jointly providing white light.

In an embodiment, the light emitting semiconductor includes at least one of Indium Gallium Nitride (InGaN), Zinc Selenid (ZnSe), and Silicone Carbide (SiC). These materials have been found as well suited for manufacturing light emitting semiconductors that emit blue/blueish light.

In an embodiment, the white light output may be aviation white light, i.e. white light which fulfills the requirements as defined in section 25.1397 of the FAR.

In an embodiment, the second light converting material is provided as a light converting layer, which is arranged on the light transmissive layer of the light source, in particular on the side of the light transmissive layer facing away from the first light converting material. In this way, the light transmissive layer may be sandwiched between the first and second light converting materials. The light transmissive layer may in particular be coated with the second light converting material.

In an embodiment, the second light converting material has a thickness of less than 1 mm, the second light converting material may in particular have a thickness of less than 0.5 mm. The second light converting material may have a thickness of at least 0.1 mm. A thickness of less than 1 mm, in particular a thickness of less than 0.5 mm, has been found as resulting in a suitable shift of the spectrum of the light, emitted by the light source, towards longer wavelengths, without unduly reducing the intensity of the light emitted by the light source.

In an embodiment, the light transmissive layer is a transparent layer, the light transmissive layer may in particular be a transparent layer that is made from glass or sapphire. The term sapphire is commonly used in the field of semiconductor light sources for the upper light transmissive layer. The term sapphire may refer to artificial sapphire glass. The light transmissive layer may be made from any suitable material, such as from the mentioned glass or sapphire, such as from silicone, or from other suitable materials that are able to sustain the operating temperature of the semiconductor light source.

In an embodiment, the lens element is a silicone based lens element. A silicone based lens element has been found as being well-suited for reliably protecting the light source and the second light converting material from adverse external influences, such as dirt, water, moisture and mechanical impacts. Also, silicone has been found to have good optical properties for forming the lens element.

In an embodiment, the lens element may be overmolded over the light source and the second light converting material for covering the light source and the second light converting material. In a method according to an exemplary embodiment of the invention, arranging the lens element over the second light converting material may include overmolding the lens element over the light source and the second light converting material.

The lens element may be provided as a hard lens element, having a low elasticity, or as a soft lens element, which has some elasticity for absorbing the forces of mechanical impact by elastic deformation.

In an embodiment, the light emitting semiconductor, the first light converting material, and the light transmissive layer are provided as an integrated light source structure, in particular as an integrated light emitting diode (LED). The LED may, in particular, be an off the shelf product, which may be produced in large numbers at lows costs. Such an off the shelf LED may be modified, in order to emit light having a desired spectrum of white light, by applying the second light converting material to the light transmissive layer of the LED.

In an embodiment, the aircraft light comprises a plurality of light sources, wherein each of the plurality of light sources has a light emitting semiconductor, a first light converting material, and a light transmissive layer, respectively. Each of the plurality of light sources may have any of the features, alone or in combination, as has been described before. By providing a plurality of light sources, a high intensity of the white light output, emitted by the aircraft light, may be achieved.

In an embodiment comprising a plurality of light sources, each of the plurality of light sources may be provided with a respective second light converting material and a respective lens element.

In an alternative embodiment, a common lens element may be arranged over a plurality of light sources, wherein each light source is provided with a respective second light converting material. The common lens element may, for example, be configured for forming a highly targeted light output of the aircraft light. In particular, the highly targeted light output may be used for employing the aircraft light as an aircraft headlight, such as a landing light or a take-off light.

In an embodiment, the aircraft light is an exterior aircraft light, i.e. an aircraft light which is configured for emitting light from an aircraft into an outside environment of the aircraft. The exterior aircraft light may in particular be one of a take-off light, a landing light, a taxi light, a runway turn-off light, a navigation light, in particular a white navigation light, and a white strobe anti-collision light. The exterior aircraft light may also be a multi-functional light, which combines the functionalities of at least two of a take-off light, a landing light, a taxi light, a runway turn-off light, a navigation light, in particular a white navigation light, and a white strobe anti-collision light.

In an embodiment, the aircraft light is an interior aircraft light, which is provided within an aircraft for illuminating an area or space within the aircraft. The interior aircraft light may in particular be a general cabin illumination light for illuminating at least a portion of the cabin of an aircraft, a personal passenger reading light, a washroom illumination light for illuminating a washroom of an aircraft, or a signal light. The signal light may, for example, be a non-smoking light, a fasten-your-seatbelt light or an indicator light which lights up in case a request for the cabin service personnel has been triggered. An interior aircraft light according to an exemplary embodiment of the invention may also be used for indicating an exit, an emergency exit and/or the shortest way to the nearest exit and/or emergency exit.

Exemplary embodiments of the invention further include an aircraft, in particular an airplane or a helicopter, comprising at least one aircraft light according to an exemplary embodiment of the invention.

BRIEF DESCRIPTION OF THE DRAWINGS

Further exemplary embodiments of the invention are described below with respect to the accompanying drawings, wherein:

FIG. 1B shows a schematic front view of the aircraft shown in FIG. 1A;

DETAILED DESCRIPTION

Figure 1A:
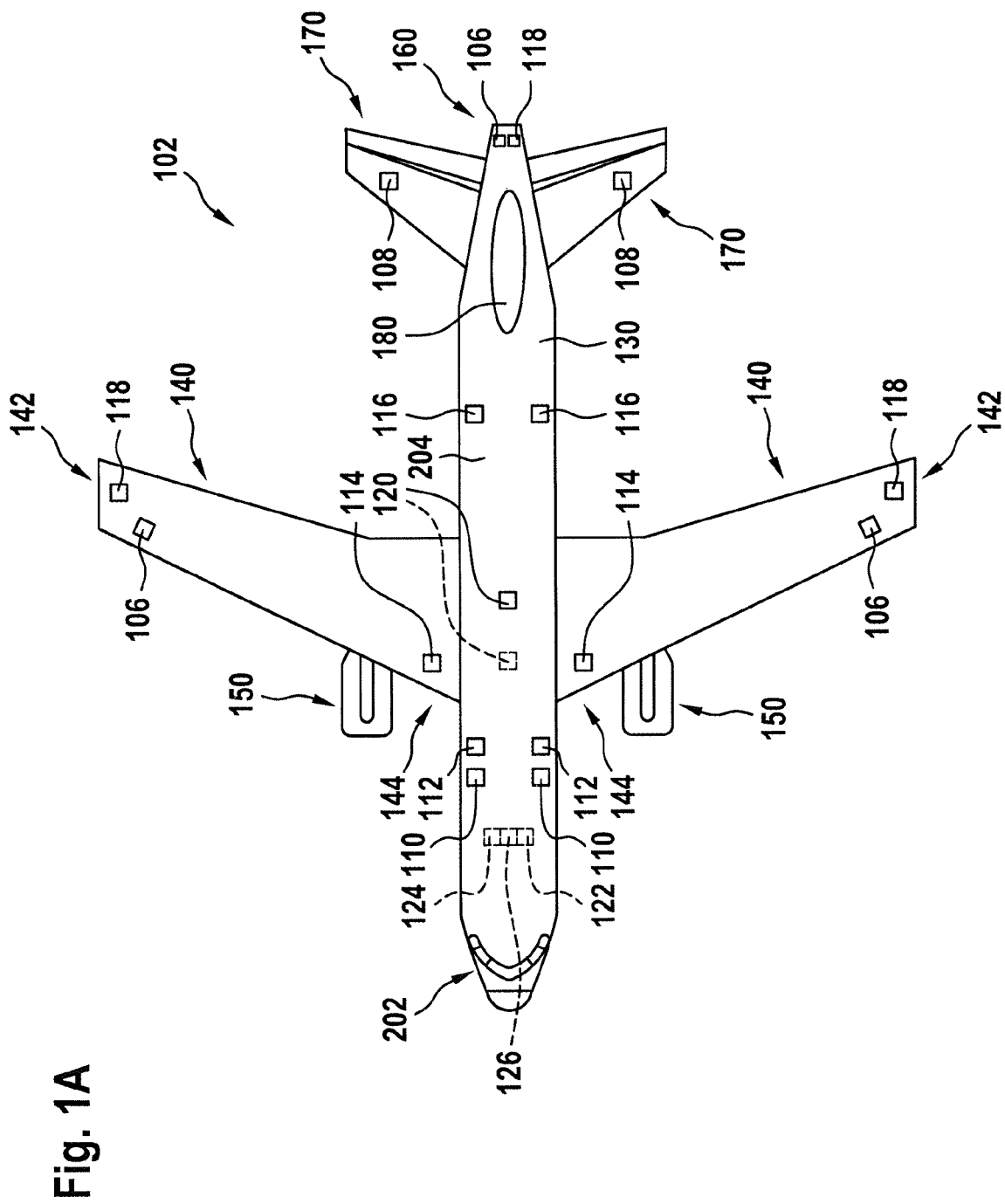
FIG. 1A shows a schematic top view of an aircraft, which is equipped with a variety of exterior aircraft lights.

FIGS. 1A and 1B, jointly referred to as FIG. 1 herein, show an aircraft 102, in particular an airplane, comprising a fuselage 130, which houses a cockpit 202 and a passenger cabin 204, and two wings 140, extending from the fuselage 130. Two horizontal stabilizers 170 and a vertical stabilizer 180 extend from a rear portion of the fuselage 130. An engine 150 is mounted to each of the wings 140, respectively. The aircraft 102 is shown in a top view in FIG. 1A and shown in a front view in FIG. 1B.

The aircraft 102 of FIG. 1 is equipped with a wide variety of exterior lights. In particular, the aircraft 102 is equipped with three navigation lights 106, two logo lights 108, two wing scan lights 110, two engine scan lights 112, two runway turn-off lights 114, two cargo loading lights 116, three white anti-collision strobe lights 118, two red-flashing anti-collision beacon lights 120, a landing light 122, a take-off light 124 and a taxi light 126. It is pointed out that these kinds of lights and their numbers are exemplary only and that the aircraft 102 may be equipped with additional lights that are not shown.

The three navigation lights 106 are positioned in the left and right wing tips 142 as well as at the tail 160 of the aircraft 102. In normal flight conditions, each one of the navigation lights 106 emits light in one of the colors green, red and white, thus indicating to the aircraft environment if they are looking at the port side, starboard side or tail side of the aircraft. The navigation lights 106 are normally on during all phases of the flight and in all flight conditions.

The logo lights 108 are directed to the vertical stabilizer 180 of the aircraft 102 and are provided for illuminating the same, in particular for illuminating the logo commonly provided on the vertical stabilizer 180. The logo lights 108 are normally switched on for the entire duration of the flight during night flights. It is also possible that the logo lights are only used during taxiing on the airport and are normally switched off during the flight.

The wing scan lights 110 and the engine scan lights 112 are positioned on the left and right sides of the fuselage 130, in front of the roots 144 of the wings 140 of the aircraft 102.

The wing scan lights 110 and the engine scan lights 112 are normally off during the flight and may be switched on periodically or upon reasonable cause by the pilots or by the aircrew, in order to check the wings 140 and the engines 150 of the aircraft 102.

The runway turn-off lights 114 are positioned in the roots 144 of the wings 140. The runway turn-off lights 114 are directed forwards and are normally switched off during the flight and switched on during taxiing, at least at night.

The cargo loading lights 116 are positioned on the left and right sides of the fuselage 130, behind the wings 140 and in front of the tail structure of the aircraft 102. They are normally switched off during the flight of the aircraft 102.

The white anti-collision strobe lights 118 are positioned in the left and right wing tips 142 as well as at the tail 160 of the aircraft 102. The white anti-collision strobe lights 118 emit respective sequences of white light flashes during normal operation of the aircraft 102. It is also possible that the white anti-collision strobe lights 118 are only operated during night and in bad weather conditions.

The red-flashing anti-collision beacon lights 120 are positioned on the top and the bottom of the fuselage 130 of the aircraft 102. They are arranged at the height of the wings in the longitudinal direction of the aircraft 102. While one of the red-flashing anti-collision beacon lights 120 is disposed on the top of the fuselage 130, the other one of the red-flashing anti-collision beacon lights 120 is disposed on the bottom of the fuselage 130 and is therefore shown in phantom in FIG. 1A. The red-flashing anti-collision beacon lights 120 are normally switched on during taxiing and during take-off and landing. Their output is perceived as a sequence of red light flashes in a given viewing direction.

In the embodiment depicted in FIGS. 1A and 1B, the runway turn-off lights 114 are located in the wings 140, in particular in the roots 144 of the wings 140, and the landing light 122, the take-off light 124 and the taxi light 126 are mounted to the front gear 135 of the aircraft 102. The front gear 135 is stored within the fuselage 130 of the aircraft 102 during flight, and it is deployed during landing, taxiing and take off.

In alternative embodiments, which are not explicitly shown in the figures, the runway turn-off lights 114 may be mounted to the front gear 135 and/or at least one of the landing light 122, the take-off light 124 and the taxi light 126 may be installed in the wings 140, in particular in the roots 144 of the wings 140, of the aircraft 102.

The aircraft 102 may also comprise a multi-functional light, which combines the functionalities of at least two of the landing light 122, the take-off light 124, the taxi light 126, the runway turn-off lights 114, a navigation light 106, and a white strobe anti-collision light 118.

Since the landing light 122, the take-off light 124, and the taxi light 126 are arranged on the bottom of the aircraft 102, they are also depicted in phantom in FIG. 1A.

Each of these exterior aircraft lights, which has a white light output, may be an aircraft light according to an exemplary embodiment of the invention.

Figure 2:
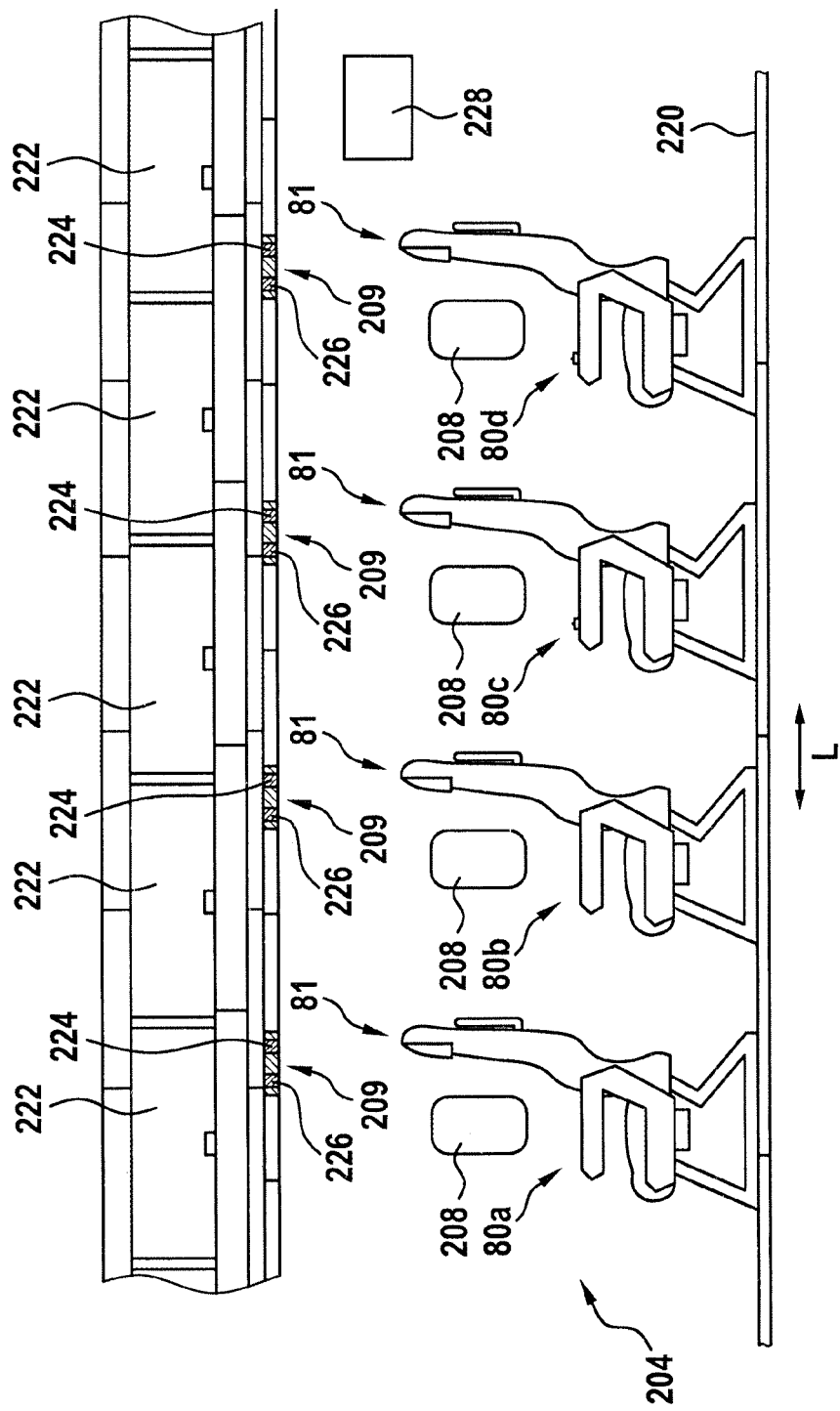
FIG. 2 shows a schematic longitudinal cross-sectional view of a section of the passenger cabin of the aircraft shown in FIGS. 1A and 1B.

FIG. 2 shows a schematic longitudinal cross-sectional view of a section of the passenger cabin 204 of the aircraft 102 shown in FIG. 1.

Four seats 81, which are also referred to as passenger seats 81, are visible in FIG. 2. The passenger seats 81 are mounted to a floor 220 of the passenger cabin 204. Each of the depicted passenger seats 81 belongs to a different seat row 80a-80d. The seat rows 80a-80d are spaced apart from each other along the longitudinal direction L of the passenger cabin 204.

For each of the seat rows 80a-80d, a window 208 is provided, which allows the passengers to view the outside of the aircraft 102. Further, a plurality of overhead baggage compartments 222, which provide storage space for the passengers' baggage, are provided above the passenger seats 81.

Each seat row 80a-80d may include a plurality of passenger seats 81, for example three passenger seats 81, which are arranged next to each other along a lateral direction, which is orthogonal to the longitudinal direction L. The additional passenger seats, i.e. the middle seat and the window seat, of each seat row 80a-80d are not visible in FIG. 2, as they are arranged behind and therefore hidden by the depicted aisle seats 81.

An aircraft overhead passenger service unit (PSU) 209 is provided above each of the seat rows 80a-80d, respectively.

Each of the aircraft overhead passenger service units 209 may comprise at least one interior aircraft light. Each of the aircraft overhead passenger service units 209 may, for example, comprise a plurality of reading lights 224, wherein the light output of each of the reading lights 224 is directed towards one of the passenger seats 81 arranged below the respective aircraft overhead passenger service unit 209. Each of the aircraft overhead passenger service units 209 may further comprise one or more signal lights 226, which may, for example, light up in case a request for the cabin service personnel has been triggered by a passenger.

The passenger cabin 204 may further comprise at least one general cabin illumination light 228 for illumination the passenger cabin 204. Washroom illumination lights may be installed within washrooms provided within the passenger cabin 204.

Each of these interior aircraft lights may be an aircraft light according to an exemplary embodiment of the invention.

Figure 3:
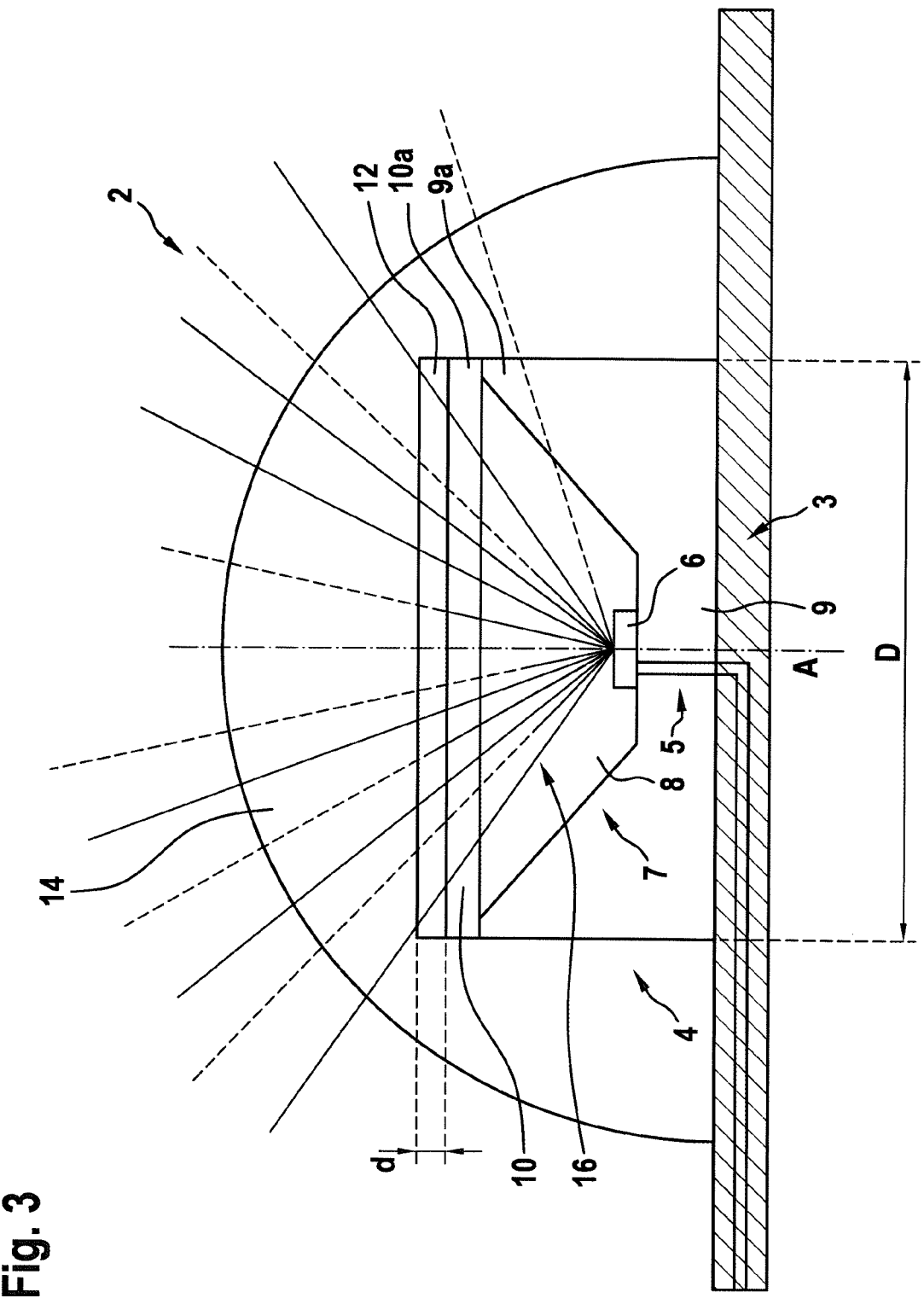
FIG. 3 depicts a schematic cross-sectional view of an aircraft light according to an exemplary embodiment of the invention.

FIG. 3 depicts a schematic cross-sectional view of an aircraft light 2 according to an exemplary embodiment of the invention. The aircraft light 2 may be one of the white light emitting exterior aircraft lights, depicted in FIGS. 1A and 1B, or one of the interior aircraft lights depicted in FIG. 2.

The aircraft light 2 comprises a support board 3, supporting a light source 4. The support board 3 may be a circuit board, in particular a printed circuit board. The circuit board may comprise electric connections 5, which are electrically coupled to the light source 4 for supplying electric power from an external electric power supply, which is not shown in FIG. 3, to the light source 4.

The light source 4 comprises a light emitting semiconductor 6 for emitting light 16 having an initial light spectrum. The initial light spectrum may comprise light having only a single wavelength or light having a plurality of wavelengths.

The initial light spectrum of the light 16, as emitted by the light emitting semiconductor 6, may be blue or blueish, i.e. the wavelengths of the light 16, emitted by the light emitting semiconductor 6, may predominantly be in the range of between 450 nm and 500 nm. Blue light is well suited for being converted into light of other colors by appropriate light converting materials and, thus, for yielding white light by mixing the original blue light with said light of other colors.

The light emitting semiconductor 6 may, for example, include at least one of Indium Gallium Nitride (InGaN), Zinc Selenid (ZnSe), and Silicone Carbide (SiC). These materials have been found as being very effective for emitting blue light.

The light source 4 further comprises a first light converting material 8, which is arranged over the light emitting semiconductor 6. The first light converting material 8 is configured such that a first portion of the light 16, which is emitted by the light emitting semiconductor 6, is shifted towards longer wavelengths by/in the first light converting material 8. In other words, a first portion of the light 16, which is emitted by the light emitting semiconductor 6, experiences a wavelength shift, when passing through the first light converting material 8.

This is illustrated in FIG. 3 as follows. Some light rays, which pass through the first light converting material 8 in an un-shifted manner, are depicted as solid lines. Other light rays, which experience a wavelength shift in the first light converting material 8 and which are thus part of above mentioned first portion of the light 16, are indicated as solid lines, when leaving the light emitting semiconductor 6, and change from being solid lines to being dashed lines within the first light converting material 8, with this change in line style indicating the wavelength shift. In this way, a mix of light that is un-shifted in wavelength and light that is shifted in wavelength, leaves the first light converting material 8. While the lines, changing their line style from solid to dashed, are shown as straight lines for ease of illustration, it is understood that the light may also change direction at the point of wavelength conversion.

The light source 4 also comprises a light transmissive layer 10, covering the first light converting material 8. The light transmissive layer 10 may in particular be a transparent layer, through which both the un-shifted light and the wavelength-shifted light pass in a substantially unaltered manner.

In the exemplary embodiment depicted in FIG. 3, the light source 4 comprises a support structure 9, which is arranged on the support board 3 and which supports the light emitting semiconductor 6 on a side facing away from the support board 3.

On the side facing away from the support board 3, a cavity 7 is formed in the support structure 9 around the light emitting semiconductor 6. The cavity 7 may have the shape of a truncated cone, having a smaller diameter at its lower end facing towards the support board 3 and having a larger diameter at its upper end facing away from the support board 3.

The cavity 7 is filled with the first light converting material 8, such that the first light converting material 8 encloses the light emitting semiconductor 6, except for the side of the light emitting semiconductor 6 that is mounted to the support board 3.

In the exemplary embodiment depicted in FIG. 3, some or all of the components of the aircraft light 2 may have rotational symmetry around a central axis A. In other embodiments, which are not explicitly shown, some or all of the components of the aircraft light 2 may have a different shape. The light source 4 and/or the light emitting semiconductor 6 may, for example, have a polygonal shape, such as a rectangular shape, in particular a quadratic shape.

The light source 4 may have a lateral extension D in the range of between 0.5 mm and 2.5 mm, in particular a lateral extension D in the range of between 1 mm and 2 mm. The lateral extension D may be the diameter of a light source with circular circumference or may be the length of one of the sides of a light source with quadratic circumference.

The light source 4 further comprises a light transmissive layer 10, which covers the side of the first light converting material 8 that is opposite to the support board 3. In the exemplary embodiment depicted in FIG. 3, an outer peripheral portion 10a of the light transmissive layer 10 additionally covers an outer peripheral portion 9a of the support structure 9.

The aircraft light 2 further comprises a second light converting material 12 and a lens element 14.

The second light converting material 12 is arranged over the light transmissive layer 10 of the light source 4, in particular on the side of the light transmissive layer 10 that is opposite to the first light converting material 8. The second light converting material 12 is configured such that the spectrum of a second portion of the light 16, which is emitted by the light emitting semiconductor 6, is shifted towards longer wavelengths by/in the second light converting material 12. In other words, some of the light 16, which is emitted by the light emitting semiconductor 6, experiences a wavelength shift when passing through the second light converting material 12.

This is illustrated in FIG. 3 as follows. Some light rays, which have passed through the first light converting material 8 in an un-shifted manner and which pass through the second light converting material 12 in an un-shifted manner, are depicted as solid lines through the second light converting material 12. Other light rays, which have passed through the first light converting material 8 in an un-shifted manner and which experience a wavelength shift in the second light converting material 12 and which are thus part of above mentioned second portion of the light 16, are indicated as solid lines, when entering the second light converting material 12, and change from being solid lines to being dashed lines within the second light converting material 12, with this change in line style indicating the wavelength shift. Yet other light rays, which have experienced a wavelength shift in the first light converting material 8 and which pass through the second light converting material 12, are indicated as dashed lines through the second light converting material 12. While the lines, changing their line style from solid to dashed, are shown as straight lines for ease of illustration, it is understood that the light may also change direction at the point of wavelength conversion.

As a result, a mix of light that is un-shifted in wavelength and light that is shifted in wavelength, leaves the second light converting material 12. As compared to the mix of light leaving the first light converting material 8, more light is wavelength-shifted in the mix of light leaving the second light converting material 12. In a case where the light emitting semiconductor 6 emits blue/blueish light and where the first and second wavelength converting materials 8, 12 provide a wavelength shift towards yellow light, the resulting color of the light, leaving the second light converting material 12, is a warmer/more yellowish light than the colder/more blueish light, leaving the first light converting material 8. In particular, while the light leaving the first light converting material 8 may be a bluish kind of white, the light leaving the second light converting material 12 may be a white shade in the aviation white color range. A white light output that is in accordance with the FAR may thus be achieved.

The lens element 14 is arranged over the second light converting material 12, such that light exiting the lens element 14 forms at least a portion of the white light output of the aircraft light 2.

The second light converting material 12, which is arranged over the light transmissive layer 10 of the light source 4, causes an additional shift of the spectrum of the light 16, which is emitted by the light emitting semiconductor 6, towards longer wavelengths. In particular, the second light converting material 12 may provide for a shift of the blueish white light, which exits the light transmissive layer 10 of the light source 4 and which enters the second light converting material 12, to an aviation white shade of light.

This results in a "warmer" light output of the aircraft light 2, as compared to the chromaticity of the light that exits the light transmissive layer 10 of the light source 4. The light output, as emitted by the aircraft light 2 after the shift in the second light converting material 12, may in particular fulfill the requirements of aviation white light, as it is defined in section 25.1397 of the FAR.

Each of the first and second light converting materials 8, 12 may be configured for emitting light having a second spectrum, when it is excited by light 16 having a first/initial spectrum, which is emitted by the light emitting semiconductor 6. The second spectrum may be shifted towards longer wavelengths with respect to the first spectrum, in order to achieve the desired effect of shifting the light 16 towards longer wavelengths when it passes through the respective light converting material 8, 12. Via the two wavelength shifting actions in the first and second light converting materials 8, 12, the overall portion of wavelength-shifted light may be tuned and a desired light output may be achieved, with the desired light output resulting from a mix of light that is un-shifted in wavelength and light that is wavelength-shifted.

The light emitting semiconductor 6, the first light converting material 8, and the light transmissive layer 10 may be provided as an integrated light source structure, in particular as a light emitting diode, which may be produced and sold as an integrated entity. Said integrated entity is at least partially covered with the second light converting material 12 for achieving above-described color conditioning.

The light emitting diode may, in particular, be an off the shelf product, which may be produced in large numbers at low costs.

As depicted in FIG. 3, the second light converting material 12 may be provided as a light converting layer, which is arranged on the light transmissive layer 10 of the light source 4. The second light converting material 12 may, for example, be a coating, which is applied to the light transmissive layer 10.

The layer formed by the second light converting material 12 may have a thickness d of less than 1 mm, in particular a thickness d of less than 0.5 mm. The layer formed by the second light converting material 12 may have a thickness d of at least 0.1 mm.

The first light converting material 8 and the second light converting material 12 may comprise the same optically active substance. In an alternative configuration, the first light converting material 8 and the second light converting material 12 may comprise different optically active substances.

In an exemplary embodiment, each of the first light converting material 8 and the second light converting material 12 may comprise Cerium doped Yttrium Aluminium Garnet and/or a nitridosilicate based light converting material as an optically active substance. It is also possible that one of the first light converting material 8 and the second light converting material 12 comprises Cerium doped Yttrium Aluminium Garnet and/or a nitridosilicate based light converting material as an optically active substance, while the other one of the first light converting material 8 and the second light converting material 12 comprises another optically active substance.

The second light converting material 12 may comprise a carrier material, into which the optically active substance is embedded. The carrier material, including the optically active substance, may then be applied to the light transmissive layer 10 for forming the layer of the second light converting material 12 on the light transmissive layer 10.

The carrier material may in particular include at least one of a silicone matrix, an epoxy matrix, and a polyurethane matrix.

The light transmissive layer 10 may be a transparent layer. The light transmissive layer 10 may in particular be made from glass, sapphire, or silicone. The sapphire may be an artificial sapphire glass.

The lens element 14 may have a predefined shape for forming a desired light output of the aircraft light 2. For example, the lens element 14 can be a free-form lens that transforms the light, exiting the second light converting material 12, into a desired navigation light output, landing light output, take-off light output/etc. It is also possible that multiple light sources 4 are provided, each having a second light converting material 12 applied thereto, and that a joint lens element forms the desired light output of the aircraft light. This approach may in particular be employed in applications where a very high light intensity is required, such as for landing lights. In the illustrative embodiment of FIG. 3, the lens element 14 is shown to have a spherical outer contour for ease of illustration. It is understood that the lens element 14 may have any suitable shape for forming a desired light output.

The lens element 14 may in particular be a silicone based lens element 14.

The lens element 14 may be overmolded over the light source and the second light converting material 12.

The lens element 14 may be configured to seal the light source 4 and the second light converting material 12 for protecting the light source 4 and the second light converting material 12 from adverse external influences, such as dirt, water and/or moisture. The lens element 14 may further protect the light source 4 and the second light converting material 12 from mechanical impacts.

The lens element 14 may be provided as a hard lens element 14, having a low elasticity. Alternatively, the lens element 14 may be provided as a soft lens element 14, which is elastic and which therefore allows for absorbing the forces of mechanical impact by elastic deformation.

The aircraft light 2 may have further components not shown in FIG. 3. For example, the aircraft light 2 may have a housing and a light transmissive protective cover. In that case, the components shown in FIG. 3 may be arranged in the space between the housing and the light transmissive protective cover.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft light with a white light output, the aircraft light comprising:
   a light source that comprises:
      a light emitting semiconductor for emitting light having an initial light spectrum;

a first light converting material, arranged over the light emitting semiconductor, wherein a first portion of the light, emitted by the light emitting semiconductor, is shifted towards longer wavelengths by the first light converting material; and a light transmissive layer, covering the first light converting material;

wherein the aircraft light further comprises:

a second light converting material, arranged over the light transmissive layer of the light source, wherein a second portion of the light, emitted by the light emitting semiconductor, is shifted towards longer wavelengths by the second light converting material; and a lens element, arranged over the second light converting material, with light exiting the lens element forming at least a portion of the white light output of the aircraft light.

2. The aircraft light according to claim 1,
wherein the initial light spectrum is blueish;
and/or
wherein the white light output is aviation white.

3. The aircraft light according to claim 1,
wherein the second light converting material is provided as a light converting layer, arranged on the light transmissive layer of the light source;
and/or
wherein the second light converting material has a thickness (d) of less than 1 mm, in particular a thickness of less than 0.5 mm.

4. The aircraft light according to claim 1,
wherein the first light converting material and/or the second light converting material comprise(s) Cerium doped Yttrium Aluminium Garnet and/or a nitridosilicate based light converting material;
and/or
wherein the first light converting material and the second light converting material comprise the same optically active substance.

5. The aircraft light according to claim 1, wherein the light transmissive layer is a transparent layer, in particular a transparent layer made from glass or sapphire.

6. The aircraft light according to claim 1, wherein the second light converting material comprises an optically active substance embedded into a carrier material, in particular embedded into a silicone matrix or an epoxy matrix or a polyurethane matrix.

7. The aircraft light according to claim 1,
wherein the lens element is a silicone based lens element;
and/or
wherein the lens element is overmolded over the light source and the second light converting material.

8. The aircraft light according to claim 1, wherein the light emitting semiconductor, the first light converting material, and the light transmissive layer are provided as an integrated light source structure, wherein the light emitting semiconductor, the first light converting material, and the light transmissive layer are in particular provided as a light emitting diode.

9. The aircraft light according to claim 1, wherein the aircraft light comprises a plurality of light sources, wherein each of the plurality of light sources has a light emitting semiconductor, a first light converting material, and a light transmissive layer, and wherein each of the plurality of light sources is provided with a respective second light converting material and a respective lens element.

10. The aircraft light according claim 1, wherein the aircraft light is an exterior aircraft light, wherein the exterior aircraft light is in particular a landing light, a take-off light, a taxi light, a runway turn-off light, a navigation light, a white strobe anti-collision light, or a multi-functional light, which combines the functionalities of at least two of a landing light, a take-off light, a taxi light, a runway turn-off light, a navigation light and a white strobe anti-collision light.

11. The aircraft light according to claim 1, wherein the aircraft light is an interior aircraft light, wherein the interior aircraft light is in particular a passenger reading light, a signal light, a general cabin illumination light, or a washroom illumination light.

12. An aircraft, in particular an airplane or a helicopter, comprising the at least one aircraft light according to claim 1.

13. A method of manufacturing an aircraft light with a white light output, wherein the method comprises:

providing a light source that comprises a light emitting semiconductor for emitting light having an initial light spectrum, a first light converting material, arranged over the light emitting semiconductor, and a light transmissive layer, covering the first light converting material, wherein the first light converting material is configured to effect a wavelength shift towards longer wavelengths for a first portion of the light, emitted by the light emitting semiconductor;

arranging a second light converting material over the light transmissive layer of the light source, wherein the second light converting material is configured to effect a wavelength shift towards longer wavelengths for a second portion of the light, emitted by the light emitting semiconductor; and arranging a lens element over the second light converting material for emitting at least a portion of the white light output.

14. The method according to claim 13, wherein the light emitting semiconductor, the first light converting material, and the light transmissive layer are provided as an integrated light source structure, wherein the light emitting semiconductor, the first light converting material, and the light transmissive layer are in particular provided as a light emitting diode.

15. The method according to claim 13, wherein said arranging of the lens element over the second light converting material includes overmolding the lens element over the light source and the second light converting material.

* * * * *